3,410,753
PROCESS FOR PRODUCING GUANYLIC ACID
Arnold L. Demain, Westfield, and Marion Jackson, Cranford, N.J., assignors to Merck & Co., Inc., Rahway, N.J., a corporation of New Jersey
No Drawing. Filed Aug. 12, 1965, Ser. No. 479,287
9 Claims. (Cl. 195—28)

ABSTRACT OF THE DISCLOSURE

Guanylic acid is produced by growing an adenine-requiring mutant of a glutamic acid producing strain of *Micrococcus glutamicus* which is characterized by the property of producing low levels of nucleotidase and phosphatase and by resisting the feedback and repressive action of guanine-containing material.

---

This invention relates to methods for producing and accumulating 5'-nucleotides. In one of its more specific aspects the invention is directed to novel methods for producing intact guanylic acid (guanosine-5'-monophosphate) by fermentation and accumulating the guanylic acid intact in the fermentation media employed.

In the course of our experimentations, we were surprised to discover that guanylic acid could be produced and excreted intact by certain unique microorganisms into culturing media therefor and that the guanylic acid excreted into said media could be so accumulated therein. We found that the unique microorganisms for achieving the aforesaid combination of results are mutants of certain strains of coryneform microorganisms capable of producing glutamic acid.

The species known commonly as *Micrococcus glutamicus* is a species which has been variously defined by other names by leading taxonomists. The classification of *Micrococcus glutamicus* is dependent upon the conditions under which the culture is grown, the criteria considered dominant in establishing the genus, and the classification scheme accepted by the taxonomist. Other investigators may classify the same microorganism as Micrococcus, Brevibacterium, Corynebacterium, Bacterium, Microbacterium or Arthrobacter. The microorganisms selected for use in the preparation of mutants are capable of producing glutamic acid and are coryneform glutamic acid-producing microorganisms. For the purposes of the present invention, all of the selected microorganisms will be referred to as *Micrococcus glutamicus*, recognizing that the classification of these microorganisms varies somewhat in accordance with the classification method employed by the taxonomist. All of such strains of microorganisms are known in the present application as *Micrococcus glutamicus*. The strains of microorganisms from which the mutants employed in the present invention are selected are further identified by the following characteristics: (1) they have defective cell membrane complexes and thus are capable of producing and excreting intact glutamic acid in a culturing media wherein the glutamic acid is accumulated; and (2) they have a low level of nucleotidase and phosphatase.

The mutants employed in the process of the present invention derived from said selected microorganisms are further characterized by unusual resistance to the feedback and repressive action of guanine or guanine-containing materials.

An object of the present invention is to provide novel methods for producing guanylic acid.

Another object of this invention is to provide novel methods of fermentation to produce guanylic acid intact and for accumulating same intact in appreciable amounts in the fermentation media.

These as well as other objects and advantages of this invention will become readily apparent from the following description given by way of illustration and not limitation.

In accordance with the process of the present invention, certain adenine-requiring mutants of a glutamic acid-producing strain of *Micrococcus glutamicus* are grown in a suitable aqueous medium under the usual conditions of aerobic growth until guanylic acid is produced and accumulated intact in appreciable amounts therein, and subsequently, in accordance with methods previously known, are treated in such a manner as to isolate and recover said guanylic acid. The process employs mutants of *Micrococcus glutamicus* which require adenine for growth and which, in addition, are characterized by the property of producing low levels of nucleotidase and phosphatase and which are further characterized by resisting the feedback and repressive action of guanine-containing materials.

Suitable media, preferably aqueous, for growing said mutants for the production and accumulation of guanylic acid therein contain (a) biotin, (b) adenine, (c) amino acids, (d) an assimilable source of carbon, for example, one or a combination of two or more saccharides or other suitable carbon sources, (e) an assimilable source of nitrogen, for example, one or a combination of two or more such nitrogen-containing compounds, (f) an assimilable source of phosphorous, for example, one or a combination of two or more of such phosphorous-containing compounds, and (g) inorganic salts for promoting the culturing of said mutants whereby guanylic acid is directly produced as a by-product of cell metabolism and excreted into and accumulated in said media.

The sources of amino acids include the acids themselves as well as mixtures or complexes thereof, such as enzymatic digest of casein, yeast autolysate, etc. The sources of carbon include various carbohydrates such as glucose, fructose, mannose, sucrose, maltose, etc. The sources of nitrogen include various ammonium compounds, such as the sulfates, chlorides, acetates, phosphates, etc. of ammonium ($NH_4$) and other nitrogenous substances, such as urea, etc. The phosphorous sources include inorganic phosphates, such as $(NH_4)_2HPO_4$, $K_2HPO_4$, $KH_2PO_4$, $Na_2HPO_4$, $NaH_2PO_4$, etc. The other organic salts preferably include $MgSO_4$ and other salts which promote the growth of said mutants. Said media can also include other compounds such as calcium carbonate for adjusting and controlling the pH of the media and/or thiamine for counteracting the toxicity of the adenine.

The culturing of said mutants is conducted in said media under aerobic conditions, preferably at temperatures in the range of about 25°–about 37° C. and preferably under pH conditions of about 6–about 8 whereby guanylic acid is produced and accumulated intact in appreciable amounts therein and from which it is isolable and recoverable.

The *Micrococcus glutamicus* organism selected produces a minor amount, if any, of nucleotidase and phosphatase. Selection of suitable microorganisms having low levels of nucleotidase and phosphatase is determined in the following manner.

The microorganism is grown by conventional submerged cultivation in an inoculum seed medium and is then transferred to a production medium whereby incubation is continued until substantially stationary growth stage is reached. The following table defines the components and proportions thereof in said seed and production media.

TABLE

| | Seed Medium (Grams) | Production Medium (Grams) |
|---|---|---|
| Dextrose | 25 | [1]80 |
| $(NH_4)_2SO_4$ | 5 | 6 |
| $(NH_4)_2HPO_4$ | | 9 |
| Urea | 5 | 5 |
| Enzymatic digest of casein | 2.5 | 10 |
| Yeast Autolysate | 2 | 2.5 |
| KCl | | 1.5 |
| $K_2SO_4$ | | 1.5 |
| $MgSO_4 \cdot 7H_2O$ | 0.25 | 0.75 |
| $MnSO_4 \cdot H_2O$ | 0.01 | 0.04 |
| $CaCl_2 \cdot 2H_2O$ | | 0.15 |
| $FeSO_4 \cdot 7H_2O$ | 0.01 | 0.01 |
| Adenine | 0.02 | 0.05 |
| Biotin | 0.00003 | 0.0001 |
| Thiamine | 0.001 | 0.001 |
| $CaCO_3$ | | 5 |
| $KH_2PO_4$ | 0.5 | |
| $K_2HPO_4$ | 0.5 | |
| $H_2O$ (Distilled) | [2] | [2] |

[1] Autoclaved separately.
[2] 1,000 ml.

Upon reaching substantially stationary growth in the production medium, the intact cells are then separated from broth by aseptic centrifugation. Said cells are suspended in a volume of water equal to that of said separated broth. To a tube having therein 0.05 ml. of water containing 0.0025 grams of disodium guanosine-5'-monophosphate·2H₂O (sterile) is added 0.5 ml. of the separated broth. To another tube also having therein 0.5 ml. of water containing 0.0025 grams of disodium guanosine-5'-monophosphate·2H₂O (sterile) is added 0.5 ml. of said cell suspension. Then they are incubated at 28° C. for 16 hours on a conventional shaker. At the end of that time a 10μl. sample of the content in each tube is paper strip assayed for guano-5'-monophosphate degradation, by using the known method wherein circular paper chromatogram is developed with n-propanol-ammonium hydroxide-water solvent (volume 6:3:1). Provided said assay of each of said 10 μl. samples shows that in each and both instances less than 50%, if any, degradation of the guanosine-5'-monophosphate therein has occurred, said microorganism has a "low level of nucleotidase and phosphatase" as used in the present description and claims and therefore is an appropriate strain from which there are obtained the unique mutants employed in this invention. However, if either of said assays shows at least 50% by weight degradation of the guanosine-5'-monophosphate therein has occurred, the microorganism does not have "a low nucleotidase and phosphatase" and therefore is not a suitable strain from which the mutants of this invention are to be obtained.

The mutants of said useful strains are obtained by natural selection, mutation or any other methods. Said mutants which have an adenine requirement are suitable for the production of and excretion of nucleotides, including guanylic acid or other guanine-containing compounds, whereas other species tested secrete not a trace of guanine-containing compounds. However, the mutants preferably employed in the practice of this invention have significantly greater resistance to feedback and repression controls exerted by individual and combinations of guanine-containing compounds such as guanine, guanosine and guanylic acid, and are obtainable by subjecting monoauxotrophic adenine-requiring mutants of said strains to one or a series of mutation techniques. These additional and preferred mutants selected to reduce feedback control or repression of the enzymes contained in the biosynthetic pathway to guanylic acid are obtained by mutation techniques, followed by the evaluation of the mutants, for example in a standard flask fermentation test and selection of those mutants which produce enhanced levels of guanylic acid as demonstrated by total guanine assay and paper strip assay. By the term "total guanine assay" we mean the total weight of the guanine-containing material calculated as disodium guanylate dihydrate $$(Na_2GMP \cdot 2H_2O)$$

per liter of broth. By "guanine-containing material" we mean guanylic acid, guanosine or guanine which alone is present or combinations of two or more of said compounds when present calculated as disodium guanylate dihydrate (Na₂GMP·2H₂O). Said preferred mutants are those which are guanine-independent and also xanthine-independent and have sufficient resistance to feedback or repression control exerted by guanine-containing material that they will produce and excrete guanylic acid into a fermentation medium therefor and will continue to produce and excrete guanylic acid therein whereby there is accumulated at least 250 milligrams thereof per liter of broth even if the fermentation medium at the beginning of culture growth and thereafter contained 75 milligrams of unrequired guanine per liter thereof. (By guanine-independent and xanthine-independent we mean that the mutants do not require either guanine or xanthine.) These mutants are not only resistant to the feedback and repression control exerted by said 75 milligrams of guanine per liter thereof but are also resistant to the increasing feedback and repression control exerted by the total amount of guanine-containing material which increases in the broth in the course of fermentation. They are so resistant to the increasing feedback and repression control exerted by increasing amounts of guanine-containing material, including guanylic acid, excreted and accumulated therein, and also other guanine-containing compounds which may have been excreted and accumulated therein in the course of fermentation that they will continue to produce and excrete guanylic acid therein to at least said level of 250 milligrams thereof per liter of broth even after the total amount of guanine-containing material, including at least 100 milligrams of guanylic acid, excreted thereby and accumulated therein reaches a level of 225 milligrams per liter of said broth. The preferred mutants employed in the practice of this invention are those having such resistances to feedback and repression of guanine-containing material that, even after the total amount of guanine-containing material, including at least 200 milligrams of guanylic acid, produced, excreted thereby and accumulated in the fermentation medium reaches a level of 450 milligrams per liter of broth, they will continue to produce and excrete guanylic acid therein at least until 500 milligrams of guanylic acid are accumulated therein.

However, the most preferred mutants are those which have such great resistance to feedback and repression exerted by guanine-containing material that, even after the total amount of guanine-containing material, including at least 400 milligrams of guanylic acid, produced, excreted thereby and accumulated in the fermentation medium reaches a level of at least 900 milligrams per liter of broth, they will continue to produce and excrete guanylic acid therein at least until the guanylic acid accumulated therein reaches a level of 1,000 milligrams per liter of broth. Under certain nutrient conditions, some of said preferred mutants used in this invention have such great resistance to feedback and repression control exerted by guanine-containing compounds that they are capable of continuing the production and excretion of guanylic acid into the broth even when the total amount of guanine-containing material, including at least 800 milligrams of guanylic acid, in the broth, is 2000 milligrams per liter thereof.

The following mutation procedures are given to show, by way of illustration and not limitation, examples of some of the methods for producing some of the mutants of said strains of *Micrococcus glutamicus* which may be obtained therefrom and are employed in the practice of this invention.

PROCEDURE 1.—MUTATION PROCEDURE TO OBTAIN "MB–1762" (ATCC 19049) AND "MB–1763" (ATCC 19050) - ADENINE - REQUIRING AUXOTROPHIC STRAINS OF PARENT MICROORGANISM ATCC 13761

ATCC 13761, a strain of said *Micrococcus glutamicus*, is maintained on a slant medium consisting of 10.0 grams of peptone, 5.0 grams of beef extract, 5.0 grams of yeast extract, 2.5 grams of NaCl, 25.0 grams of agar and 1000 ml. of distilled water and also sufficient sodium hydroxide to adjust the pH of the slant medium to 7.2.

Step No. 1

Said ATCC 13761 on said slant medium is inoculated into a flask of a liquid vegetative seed medium A consisting of 20.0 grams of enzymatic digest of casein, 5.0 grams of yeast extract, 10.0 grams of dextrose, 1000 ml. of distilled water and sufficient sodium hydroxide to adjust said medium to pH 7.1. The inoculated medium is shaken for 24 hours while being maintained at 28° C. to produce a broth containing a heavy cell growth.

Step No. 2

3 ml. of said broth is centrifuged in a 15 x 125 mm. tube to separate the microorganisms from the liquid. The microorganisms are washed in buffer No. 1, which is a 0.2 molar acetate buffer whose pH is between 4.8–5.0 and consists of 3.28 grams of sodium acetate, 1.0 ml. of glacial acetic acid and sufficient water to provide a total volume of 283 ml. Then the so-washed microorganisms are resuspended in 0.5 ml. of fresh buffer No. 1.

Step No. 3

A mutagen, N-methyl-N-nitroso-N'-nitroguanidine, is dissolved in fresh buffer No. 1 to provide a solution thereof containing 4 mg. thereof per ml. of said solution. Then 0.2 ml. of said mutagen solution is added to said 0.5 ml. cell suspension. This mutagen containing cell suspension is incubated in a 31°–32° C. water bath for 3 hours and then centrifuged to separate the resultant cells therefrom. Those cells are washed in fresh seed medium A and then resuspended in 10 ml. of fresh seed medium A.

Step No. 4

This cell suspension is transferred to a 125 ml. Erlenmeyer flask and maintained at 28° C. for 16 hours on a rotating shaker whereby growth occurs.

Step No. 5

Then the cells are separated therefrom by centrifuging and are then resuspended in a small quantity of a pre-prepared "Davis salts" solution consisting of 7 grams of $K_2HPO_4$, 3 grams of $KH_2PO_4$, 1 gram of $(NH_4)_2SO_4$, 0.5 gram of sodium citrate, 0.1 gram of $MgSO_4 \cdot 7H_2O$ and 1000 ml. of distilled water. The cell suspension in the Davis salts solution is held at 4° C. for the next step.

Step No. 6

Samples of said cell suspension are diluted with Davis salts solution and plated onto $AU_1$ medium plates. The $AU_1$ medium used consists of 25.0 grams of dextrose, 10 mg. of $FeSO_4 \cdot 7H_2O$, 5.0 grams of $(NH_4)_2SO_4$, 5.0 grams of urea, 10 mg. of $MnSO_4 \cdot H_2O$, 250 mg. of $MgSO_4 \cdot 7H_2O$, 20 grams of agar, 30 μg. of biotin, 1 mg. of thiamine, 0.5 gram of $KH_2PO_4$, 0.5 gram of $K_2HPO_4$, 20 mg. of adenine and 1 liter of distilled water. Before sterilization, this medium has a pH of 7.2. Colonies are grown on medium $AU_1$ by maintaining said plated medium at 28° C. for 3 days.

Step No. 7

Then replication thereof is effected on $U_1$ (minimal) and $AU_1$ (maximal) media plates which are thereafter incubated at 28° C. for 1 day and scored for auxotrophs, whereby adenine-requiring auxotrophs of said ATCC 13,761 are obtained. ($U_1$ is the same as $AU_1$ except that the adenine is omitted therefrom.) Said auxotrophic strains called "MB–1762" and "MB–1763" are capable of producing and accumulating intact inosinic acid in a biotin and adenine-containing culturing medium therefor.

Step No. 8

These cultures "MB–1762" and "MB–1763" are inoculated onto $U_{13}$ slants which are then maintained at 28° C. for two days whereby heavy growth occurs. ($U_{13}$ is the same as $AU_1$ except that it has the following additional components per liter of $AU_1$: 5.0 grams of enzymatic digest of casein and 2.5 grams of yeast autolysate.)

PROCEDURE 2. — MUTATION PROCEDURE TO OBTAIN "MB–1765" (ATCC 19051)-XANTHINE-REQUIRING AUXOTROPHIC STRAIN OF "MB–1762"

The culture "MB–1762" is mutated in the following manner whereby xanthine-requiring auxotroph thereof is produced and is called "MB–1765."

Repeat Step No. 1, except for culture ATCC 13761 substitute culture "MB–1762" and for the liquid seed medium A substitute liquid seed medium B. (Seed medium B is of the same composition as $U_{13}$ except that the agar has been omitted.) Repeat Step No. 2 except that instead of "3 ml.," substitute "7 ml.". Repeat Step No. 3, except that the mutagen solution is 3 mg. of said mutagen per ml. of solution and instead of the seed medium A, substitute seed medium B. Repeat Steps Nos. 4 and 5. Repeat Step No. 6, except for the $AU_1$ medium, substitute medium $GAU_1$. ($GAU_1$ is the same as $AU_1$ except that it contains an additional component: 20 mg. of guanine hydrochloride per liter of $AU_1$.) Repeat Step No. 7, except for $AU_1$ substitute $GAU_1$ and for $U_1$ (minimal) substitute $AU_1$ (minimal) whereby said "MB–1765" is obtained and is hereinafter sometimes referred to as subparental microorganisms. These microorganisms require biotin, adenine and also xanthine or guanine. Repeat Step No. 8, except that the slant medium is $U_{12}$ instead of $U_{13}$ whereby a heavy growth of "MB–1765" on slant $U_{12}$ is obtained. ($U_{12}$ is the same as $AU_1$ except that the dextrose content thereof has been increased to 45.0 grams and contains the following additional components per liter of $AU_1$: 2.0 grams of yeast autolysate, 2.5 grams of enzymatic digest of casein, 20 mg. of guanine·HCl.)

PROCEDURE 3. — MUTATION PROCEDURE TO OBTAIN "MB–1914" (ATCC 19055) AND "MB–1915" (ATCC 19056)-AMINO ACID-REQUIRING AUXOTROPHIC STRAINS OF "MB–1762"

The culture "MB–1762" is mutated in substantially the same manner as that used for obtaining "MB–1765" except that plating and replicating are done on $AU_1$ (minimal) and $7AU_1$ (maximal). The $7AU_1$ is the same as $AU_1$ except that it contains the following additional components per liter of $AU_1$: 10 grams of acid hydrolyzed casein, 2.5 grams of yeast extract, 0.1 gram of DL-tryptophane and 1 milligram of vitamin $B_6$, the last being added after sterilization. On the basis of successful growth of $7AU_1$ and inability to grow on $AU_1$, mutants are obtained and selected based upon positive paper strip tests for guanylic acid production and also for the production of guanine-containing material whereby mutants "MB–1914" and "MB–1915" are selected. Microorganism "MB–1914" gives a positive paper strip test for guanylic acid and an increase of 320% in the production of total guanine-containing compounds compared with the parent culture "MB–1762." "MB–1914" has the further characteristic of requiring several unidentified amino acids for growth. "MB–1915" is an isoleucine auxotroph of "MB–1762" and is tested in like manner and also gives a positive paper strip test for guanylic acid and an increase of 88% in the production of total guanine-containing material compared with "MB-1762."

PROCEDURE 4. — MUTATION PRECEDURE TO OBTAIN "MB-1916" (ATCC 19057) - TRYPTOPHANE-REQUIRING AUXOTROPHIC STRAIN OF "MB-1763"

The culture "MB-1763" is mutated by the same procedure as that for obtaining "MB-1914" and "MB-1915" and the microorganism "MB-1916" is selected on the basis of auxotrophy and passing a conventional plate screening test for total guanine-containing material. This microorganism "MB-1916" gives a positive strip test for guanylic acid and an increase of 121% in production of guanine-containing compounds when compared with "MB-1763." the microorganism "MB-1916" is further characterized as having a tryptophane requirement for growth.

PROCEDURE 5.— MUTATION PROCEDURE FOR OBTAINING "MB-1806" (ATCC 19053) AND "86-35" XANTHINE-INDEPENDENT REVERTANT STRAINS OF "MB-1765"

Said microorganism "MB-1765" is mutated in the following manner whereby auxotrophs thereof are produced.

Said "MB-1765" on slant $U_{13}$ is inoculated into a flask of a liquid seed medium C which is of the same composition as $U_{12}$ except that the agar has been omitted therefrom. The inoculated medium is shaken for 24 hours while being maintained at 28° C. to produce a broth containing a heavy cell growth. 15 ml. of said broth is centrifuged in a 15 x 125 mm. tube to separate the microorganisms from the liquid. The microorganisms are then washed with said buffer No. 1 and resuspended in 0.5 ml. of fresh buffer No. 1. Said mutagen is dissolved in fresh buffer No. 1 to provide a solution thereof containing 3 mg. of mutagen per ml. of said solution. Then 0.1 ml. of said mutagen solution is added to said 0.5 ml. suspension. This mutagen containing cell suspension is incubated in a 31°-32° C. water bath for one hour and then centrifuged to separate the resultant cells therefrom. The cells are washed with Davis salts solution and then suspended in 3 ml. of fresh Davis salts solution. This suspension is plated on medium plates whose composition is the same as $AU_1$ except that it contains an additional component: 10 grams of acid hydrolyzed casein (vitamin and salt-free) per liter of $AU_1$. Said plated medium is maintained at 28° C. for five days, whereby colonies of said revertant strains of "MB-1765" are obtained and two were selected based upon reversion to xanthine-independence and by passing a conventional plate screening test for production of total guanine-containing compounds. One of said revertants gave a positive paper strip assay for the production of guanylic acid and an increase of 43% in production of total guanine-containing material when compared with its grandparent "MB-1762." The other, known as "MB-1806" gives a positive strip assay for the production of guanylic acid and an increase of 143% in the production of total guanine-containing material. Said "MB-1806" is inoculated onto a $U_{13}$ slant which is then maintained at 28° C. for two days, whereby heavy growth occurs.

Said culture "MB-1806" is one of the most preferred mutants employed in the practice of this invention. It has no xanthine or guanine requirement, but requires leucine and isoleucine and is capable of producing and accumulating guanylic acid and also inosinic acid intact in culturing media therefor. It has the biotin and adenine requirements of its grandparent "MB-1762" and also has the additional characteristic of growth stimulation by valine.

PROCEDURE 6.—MUTATION PROCEDURE TO OBTAIN "MB-1802" (ATCC 19052)-AMINO ACID-REQUIRING POLYAUXOTROPHIC STRAIN OF "MB-1806" AND TO OBTAIN LEUCINE-ISOLEUCINE INDEPENDENT REVERTANT STRAINS OF "MB-1806"

"MB-1806" is grown in a $U_{13}$ seed medium for 24 hours at 28° C. Then 5 ml. of the broth is centrifuged to separate the cells therefrom. The separated microorganisms are washed and resuspended in 0.5 ml. of 0.5 molar pH 5.0 acetate buffer. Then said mutagen is dissolved in a quantity of said buffer to provide a solution containing 9 mg. of mutagen per ml. of said solution. Then 0.3 ml. of said mutagen solution is added to 0.5 ml. cell suspension, incubated at 31°-32° C. for one hour, and centrifuged to separate the resultant cells. The resultant cells are washed with Davis salts solution and suspended in 3 ml. thereof, after which they are subjected to a post-incubation treatment for 4½ hours at 28° C. in a $U_{13}$ seed medium. Platings are made on an $8AU_1$ medium and replication on $8AU_1$ medium (maximal) and on a modified $AU_1$ medium (minimal). (The modified $AU_1$ medium contains leucine and isoleucine as additional components) and a microorganism, known as "MB-1802," was selected and obtained and was put on a $U_{13}$ slant. This microorganism is a preferred mutant employed in the practice of this invention. It has the same requirements as its parent and also has requirements for methionine, threonine and phenylalanine and is further stimulated by cystine and tryptophane.

Plating of said microorganism "MB-1806" in said seed $U_{13}$ at the end of said post-incubation treatment is also made on the $AU_1$ medium. Forty-six revertant colonies grew on said medium. Of these, a number were selected and obtained, which are capable of producing amounts of guanylic acid as great as that produced by the parent "MB-1806" and five of them were found to be capable of producing amounts of guanylic acid significantly in excess of that produced by the parent. All of said selected microorganisms have only biotin and adenine requirements.

PROCEDURE 7.—MUTATION PROCEDURE TO OBTAIN "MB-1807" (ATCC 19054)-ADENINE REQUIRING AUXOTROPHIC STRAIN OF PARENTAL MICROORGANISM ATCC 13032

ATCC 13032 slant ($U_{13}$ medium) is inoculated into a flask containing a $U_{13}$ liquid medium which is shaken for sixteen hours at 28° C. with a heavy growth resulting. Five ml. of this broth is centrifuged in a 15 x 125 mm. tube, washed in 2.5 ml. (0.5 mole) pH 5.0 acetate buffer and resuspended in 0.5 ml. of the same buffer to produce a cell suspension.

The mutagen N-methyl-N-nitroso-N'-nitroguanidine is dissolved at 10 mg./ml. in the pH 5.0 acetate buffer. Four-tenths ml. of this solution is added to said 0.5 ml. cell suspension.

This cell suspension is incubated in an $H_2O$ bath at 31.5° C. for 1½ hours. After treatment, the mutagen solution is removed by centrifugation and the cells are washed in 2 ml. of $U_{13}$ liquid medium and the cells are resuspended in 10 ml. of the same medium which is then transferred to a 125 ml. Erlenmeyer flask and shaken at 28° C. for 4 to 4½ hours. The cells are then removed by centrifugation and resuspended in 5 ml. Davis salts which are held at 4° C. and from which they are diluted and plated onto $AU_1$ medium plates. After colony growth (3 days at 28° C.), these plates are replicated on $U_1$ (minimal) and $AU_1$ (maximal) plates which are incubated for one day at 28° C. and then examined for adenineless auxotrophs. The culture, representative specimen of which is "MB-1807" is one of the adenine-requiring auxotrophs obtained and selected in this experiment. This culture is then carried on $U_{15}$ slant medium and is capable of producing 5'-nucleotides in an appropriate culturing medium. This slant is the same as $U_{13}$ except that it contains 2.5 grams of enzymatic digest of casein and 2.5 grams of yeast autolysate per liter of $U_{13}$.

PROCEDURE 8.—MUTATION PROCEDURE TO OBTAIN MUTANTS N4–1 AND N4–2-ISOLEUCINE-REQUIRING AUXOTROPHIC STRAINS OF "MB–1807"

The foregoing procedure is repeated as recited for obtaining the "MB–1807" culture, except that the starting culture used herein is "MB–1807" in place of ATCC 13032, and the plating media used are $AU_1$ (minimal) and modified $GAU_1$ (maximal). The modified $GAU_1$ contains 100 milligrams of leucine, isoleucine and valine per liter of $GAU_1$. The colonies are scored as before except that cultures are selected and obtained on the basis of isoleucine requirement. Cultures Nos. N4–1 and N4–2 were so obtained and both of them gave positive paper strip tests for guanylic acid production. Cultures Nos. N4–1 and N4–2 give increases of 200% and 177%, respectively, in the production of total guanine-containing material compared with their parent "MB–1807."

PROCEDURE 9.—MUTATION PROCEDURE TO OBTAIN "MB–1813"-XANTHINE-REQUIRING AUXOTROPHIC STRAIN OF "MB–1807" AND TO OBTAIN "MB–1917" (ATCC 19058), "MB–1918" (ATCC 19059) AND "MB–1919" (ATCC 19060)-XANTHINE-INDEPENDENT REVERTANTS OF "MB–1813"

The same general procedure as that hereinbefore described is employed for obtaining "MB–1765" except that "MB–1807" is substituted for the "MB–1762" whereby there is selected and obtained culture "MB–1813" which requires xanthine. "MB–1813" is mutated in the same general manner as is "MB–1765," as hereinbefore described, after which, based upon reversion of the xanthine block to prototrophy 70 revertant mutants were selected and obtained and evaluated in shake flasks for guanylic acid capacity and total guanine assay. Forty-seven of said cultures gave a paper strip assay for guanylic acid production in excess of that of the grandparent "MB–1807." Thirty of said 70 cultures were then eliminated from the following analyses for total guanine assays because of the production and presence of an interfering compound therein. of the 40 cultures remaining on which valid total guanine assays were obtained, the following yield classification compared to that of the grandparent "MB–1807" was demonstrated and recorded:

Number of revertants whose production gave a total guanine assay of 75% to 125% of the control "MB–1807" _____ 10
Number of revertants whose production gave a total guanine assay of 125% to 200% of that of the control "MB–1807" _____ 24
Number of revertants whose production gave a total guanine assay of more than 200% of that of the control "MB–1807" _____ 6

These 40 microorganisms had been reverted from the xanthine requirement and require only adenine and biotin for growth. Of said six revertants, one of them is known as "MB–1917," another is known as "MB–1918" and still another is known as "MB–1919." "MB–1917" differs from "MB–1918' and 'MB–1919" in that it appears to have a very weak or "leaky" requirement for an unidentified component of casein hydrolysate which may act as a stimulant for growth.

PROCEDURE 10.—PRODUCTION OF GUANYLIC ACID

Each of the various preferred microorganisms is grown in an appropriate seed medium therefor. The seed medium used is the same as the slant medium, where used, except that the agar component is omitted. Each seed medium is prepared in a 250 ml. flask after which it is inoculated with the microorganism and subsequently incubated at 28° C. for 20 hours while on a rotating shaker whereby a seed growth in suspension is produced.

The following fermentation production media are used and consist of the components in the amounts set forth in the following table:

| Components | Fermentation Production Media, Grams | | |
|---|---|---|---|
| | I | II | III |
| $(NH_4)_2SO_4$ | 6.0 | 6.0 | 6.0 |
| $(NH_4)_2HPO_4$ | 9.0 | 9.0 | 9.0 |
| KCl | 1.5 | 1.5 | 1.5 |
| $K_2SO_4$ | 1.5 | 1.5 | 1.5 |
| $MgSO_4 \cdot 7H_2O$ | 0.75 | 0.75 | 0.75 |
| $MnSO_4 \cdot H_2O$ | 0.12 | 0.12 | 0.12 |
| $FeSO_4 \cdot 7H_2O$ | 0.03 | 0.03 | 0.03 |
| $CaCl_2 \cdot 2H_2O$ | 0.15 | 0.15 | 0.15 |
| $ZnSO_4 \cdot 7H_2O$ | 0.02 | 0.10 | 0.10 |
| Biotin | 0.0001 | 0.0001 | 0.0001 |
| Thiamine | 0.001 | 0.001 | 0.001 |
| Adenine | 0.1 | 0.1 | 0.1 |
| Urea | 5.0 | 5.0 | 5.0 |
| Enzymatic digest of casein | 15.0 | 15.0 | 15.0 |
| Yeast autolysate | 5.0 | 5.0 | 5.0 |
| Na Citrate | | | 2.5 |
| Na Acetate | | 2.5 | |
| $K_2HPO_4$ | | 5.0 | 5.0 |
| $CaCO_3$ | 5.0 | 5.0 | 5.0 |
| Dextrose (sterilized separately) | 80.0 | 90.0 | 90.0 |
| Distilled water | 1,000 | 1,000 | 1,000 |
| pH (unadjusted) before sterilization | 7.4–7.6 | 7.4–7.6 | 7.4–7.6 |

The following are specific examples given by way of illustration and not limitation of some of the methods of this invention for producing and accumulating guanylic acid intact, and the specific culturing or fermentation media used are also given by way of illustration and not limitation.

Example 1

Twenty ml. of medium I is dispensed into each of a number of 250 ml. Erlenmeyer flasks; are then inoculated with 0.5 ml. of said previously-prepared seed growth of "MB–1806" in suspension, and incubated for four days at 20° C. on a rotating shaker. The contents of all flasks are pooled and then the pool is centrifuged to separate the cells therefrom and the supernatant broth is recovered. The broth assayed for guanylic acid and other substances by bioassay and chromatograms and the results ascertained were recorded and appear in the following table. As a control the foregoing was repeated, substituting "MB–1762" for "MB–1806."

Example 2

Example 1 is repeated, except that "medium II" is substituted for "medium I."

Example 3

Example 2 is repeated, except that "MB–1802" is substituted for "MB–1806."

Example 4

Example 3 is repeated, except that "medium III" is substituted for "medium II."

Example 5

Example 4 is repeated, except that "MB–1806" is substituted for "MB–1802."

Example 6

Example 4 is repeated. In this example, the assay of 98 pooled flasks which include 12% of wash water is ascertained and consequently the assay shown in the table should be 12% greater than that set forth.

Examples 7–11

Example 2 is repeated six times, except that "MB–1914," "MB–1916," "MB–1917," "MB–1918" and "MB–1919" are, respectively, substituted for "MB–1806."

SUMMARY OF RESULTS OBTAINED IN EXAMPLES 1–11

| Ex. No. | Culture | Production Medium | Total Guanine Bioassay, g./liter | Intensity of spot on paper chromatograms | |
|---|---|---|---|---|---|
| | | | | Guanylic Acid | Guanine plus Guanosine |
| 1 | Control MB-1762 | I | .25 | Trace | Trace |
| 1 | MB-1806 | I | .50 | +2 | 0 |
| 2 | Control MB-1762 | II | .23 | Trace | 0 |
| 2 | MB-1806 | II | .61 | +5 | 0 |
| 3 | MB-1802 | II | 2.20 | +8 | +8 |
| 4 | MB-1802 | III | .98 | +10 | 0 |
| 5 | MB-1806 | III | .53 | +6 | 0 |
| 6 | MB-1802 | III | .80 | +9 | 0 |
| 7 | MB-1914 | II | .45 | | |
| 8 | MB-1916 | II | .35 | | |
| 9 | MB-1917 | II | .48 | +2 | 0 |
| 10 | MB-1918 | II | .55 | +2 | 0 |
| 11 | MB-1919 | II | .49 | +2 | 0 |

The figures under "Total Guanine Bioassay" represent grams of guanine-containing material calculated as disodium guanylate dihydrate ($Na_2GMP \cdot 2H_2O$) per liter of broth. The bioassaying was effected by employing a conventional method using a guanine-requiring *B. subtilis* culture which responds also to guanine and guanosine besides guanylic acid. The standard used was pure disodium salt of guanylic acid with 2 moles of water of crystallization. The relative contributions to the bioassay value by guanylic acid, guanosine and guanine was estimated by conventional paper chromatography, as indicated on page 5.

The mutants preferably employed in the practice of the present invention, some examples of which are microorganisms "MB–1914," "MB–1917," "MB–1918," "MB–1919," "MB–1806" and "MB–1802," as well as others disclosed herein, are all xanthine-independent and guanine-independent and capable of producing and excreting guanylic acid into fermentation media therefor, whereby said guanylic acid is accumulated therein in amounts of at least 250 milligrams thereof per liter of broth due to their resistance to feedback and repression exerted by guanine-containing material produced by said microorganisms and accumulated in said broth in the course of fermentation. As shown in the last table, some of them have such great resistance that they are capable of producing at least 500 milligrams of guanylic acid per liter of broth. Also, the microorganism "MB–1802" is capable of producing more than 1000 milligrams of guanylic acid per liter of said broth and other mutants of "MB–1806" which grew on the modified $AU_1$ medium were capable of producing large amounts of guanylic acid. Also, at least five of the 46 colonies of mutated "MB–1806" had even greater resistance to feedback and repression exerted by guanine-containing material and they were found to be capable of producing guanylic acid in excess of the amount produced by "MB–1806."

It is to be understood that the terms "guanylic acid" and "glutamic acid" as used in the present description and claims are intended to mean those respective compounds which contain a guanylate radical or anion and a glutamate radical or anion, thereby to include said compounds in the form of acids when the cations thereof are hydrogen and also in the form of salts thereof when said cations are other than hydrogen, as for example, a metal, ammonium, etc.

The term "biotin" as used in the present description and claims is intended to mean biotin per se or any other growth factor which will substitute for biotin in a strain of *Micrococcus glutamicus* which requires biotin for growth. One such growth factor which has been described is oleic acid, which may be substituted in place of biotin in biotin-requiring strains of the genus *Micrococcus glutamicus*.

As indicated in the foregoing disclosure, selected mutant strains of *Micrococcus glutamicus* microorganisms have been isolated and deposited in the Merck Culture Collection and have also been deposited in the American Type Culture Collection, Washington, D.C. The Merck Culture Collection numbers and the corresponding American Type Culture Collection numbers are listed in the following table.

| Merck Culture Collection Number: | American Type Culture Collection Number |
|---|---|
| MB–1762 | 19049 |
| MB–1763 | 19050 |
| MB–1765 | 19051 |
| MB–1914 | 19055 |
| MB–1915 | 19056 |
| MB–1916 | 19057 |
| MB–1806 | 19053 |
| MB–1802 | 19052 |
| MB–1807 | 19054 |
| MB–1917 | 19058 |
| MB–1918 | 19059 |
| MB–1919 | 19060 |

Various changes and modifications of the invention can be made, and to the extent that such variations incorporate the spirit of this invention, they are intended to be included within the scope of the appended claims.

What is claimed is:

1. A process for producing guanylic acid which comprises growing an adenine-requiring mutant of a glutamic acid-producing strain of *Micrococcus glutamicus*, said mutant characterized by the property of producing low levels of nucleotidase and phosphatase and by resisting the feedback and repressive action of guanine-containing material, in an aqueous nutrient medium containing assimilable sources of carbon, nitrogen, adenine and phosphorous-containing compounds and recovering the guanylic acid which is excreted into said medium.

2. A process for producing guanylic acid which comprises growing an adenine-requiring mutant of a glutamic acid-producing strain of *Micrococcus glutamicus*, said mutant characterized by the property of producing low levels of nucleotidase and phosphatase and by resisting the feedback and repressive action of guanine-containing material, in an aqueous nutrient medium containing assimilable sources of carbon, nitrogen, adenine and phosphorous-containing compounds and recovering guanylic acid.

3. A process according to claim 1 wherein the selected mutant is further characterized by having a specific requirement for isoleucine for optimum growth.

4. A process according to claim 1 wherein the selected mutant is further characterized by having a specific requirement for tryptophane for optimum growth.

5. A process according to claim 1 wherein the selected mutant is further characterized by having a specific requirement for leucine and isoleucine for optimum growth.

6. A process according to claim 1 wherein the selected mutant is further characterized by having a specific requirement for leucine, isoleucine, methionine, cystine, tryptophane, threonine and phenylalanine for optimum growth.

7. A method for producing guanylic acid comprising: under aerobic conditions in an aqueous fermentation medium containing biotin, adenine, amino acids, sources of carbon, nitrogen, and phosphorous, growing a mutant of a strain of *Micrococcus glutamicus*, and recovering the guanylic acid which is excreted into said medium, said strain having a low level of nucleotidase and phosphatase and being capable of producing and excreting glutamic acid; said mutant being guanine-independent and xanthine-independent and being capable of producing and excreting intact guanylic acid into said medium wherein it is accumulated, said mutant being sufficiently resistant to feedback and repressive action of guanine-containing material that, even after the total amount of guanine-containing material, including at least 100 milligrams of guanylic acid, produced and excreted thereby and accumulated in said medium reaches a level of 225 milligrams per liter of broth, it will continue to produce and excrete guanylic acid therein at least until the amount of said guanylic acid accumulated therein is 250 milligrams per liter of said broth.

8. A method for producing guanylic acid comprising: under aerobic conditions in an aqueous fermentation medium containing biotin, adenine, amino acids, sources of carbon, nitrogen, and phosphorous, growing a mutant of a strain of *Micrococcus glutamicus,* and recovering the guanylic acid which is excreted into said medium, said strain having a low level of nucleotidase and phosphatase and being capable of producing and excreting glutamic acid; said mutant being guanine-independent and xanthine-independent and being capable of producing and excreting intact guanylic acid into said medium wherein it is accumulated, said mutant being sufficiently resistant to feedback and repressive action of guanine-containing material that, even after the total amount of guanine-containing material, including at least 200 milligrams of guanylic acid, produced and excreted thereby and accumulated in said medium reaches a level of 450 milligrams per liter of broth, it will continue to produce and excrete guanylic acid therein at least until the amount of said guanylic acid accumulated there is 500 milligrams per liter of said broth.

9. A method for producing guanylic acid comprising: under aerobic conditions in an aqueous fermentation medium containing biotin, adenine, amino acids, sources of carbon, nitrogen, and phosphorous, growing a mutant of a strain of *Micrococcus glutamicus,* and recovering the guanylic acid which is excreted into said medium, said strain having a low level of nucleotidase and phosphatase and being capable of producing and excreting glutamic acid; said mutant being guanine-independent and xanthine-independent and being capable of producing and excreting intact guanylic acid into said medium wherein it is accumulated, said mutant being sufficiently resistant to feedback and repressive action of guanine-containing material that, even after the total amount of guanine-containing material, including at least 400 milligrams of guanylic acid, produced and excreted thereby and accumulated in said medium reaches a level of 900 milligrams per liter of broth, it will continue to produce and excrete guanylic acid therein at least until the amount of said guanylic acid accumulated therein is 1,000 milligrams per liter of said broth.

References Cited

UNITED STATES PATENTS 3,211,629 10/1965 Abe et al.
3,152,966 10/1964 Kinoshita et al.

ALVIN E. TANENHOLTZ, *Primary Examiner.*